H. W. HALES.
PHOTOGRAPHIC CAMERA.
APPLICATION FILED SEPT. 29, 1916.
1,244,978.
Patented Oct. 30, 1917.
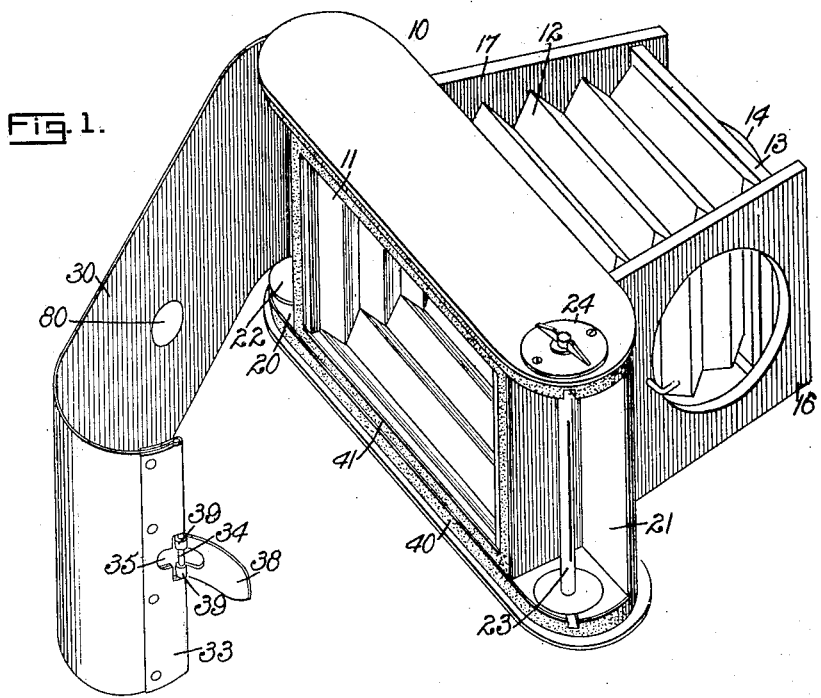
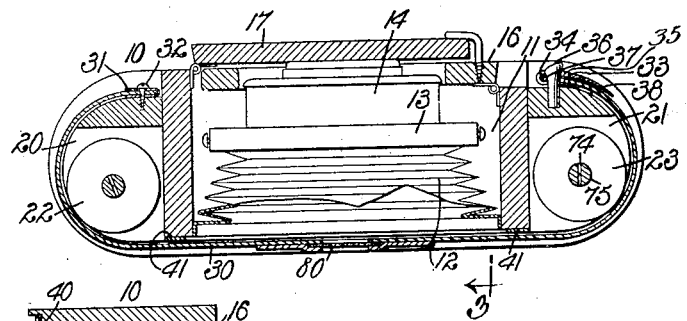
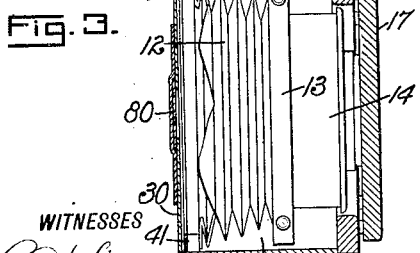
WITNESSES
INVENTOR
Henry W. Hales
BY
ATTORNEYS

UNITED STATES PATENT OFFICE.

HENRY W. HALES, OF RIDGEWOOD, NEW JERSEY.

PHOTOGRAPHIC CAMERA.

1,244,978. Specification of Letters Patent. Patented Oct. 30, 1917.

Application filed September 29, 1916. Serial No. 122,872.

*To all whom it may concern:*

Be it known that I, HENRY W. HALES, a citizen of the United States, and a resident of Ridgewood, in the county of Bergen and State of New Jersey, have invented a new and Improved Photographic Camera, of which the following is a full, clear, and exact description.

Modern anastigmat lenses as now made require a camera of the utmost rigidity in order to render the extremely fine definition, and this the ordinary cameras especially the small and compact ones, often fail to do. The object of this invention is not only to obtain extreme rigidity but also to render the camera much lighter in weight, easier to load and of such construction that there are no detached parts to be lost or injured when in use and to provide a more absolutely light-tight camera. Another object is to permit of folding the camera parts into a very compact form and yet hold the parts securely in place when extended for use.

The invention is particularly applicable to cameras using a roll film unwinding from one spool and winding up on another spool.

In order to produce the desired result, use is made of a casing having spool compartments and a flexible back secured at one end to the casing and detachably secured at its other end to the casing, the said back extending over and being adapted to close or open the said spool compartments. Use is also made of side plates hinged on the front of the casing and adapted to be engaged by the objective carrier to support the latter in extended position, the said side plates being adapted to fold one in front of the other.

A practical embodiment of the invention is represented in the accompanying drawings forming a part of this specification, in which similar characters of reference indicate corresponding parts in all the views.

Figure 1 is a perspective view of the camera with the parts in extended position and the back open;

Fig. 2 is a sectional plan view of the same with the parts in folded position;

Fig. 3 is a sectional side elevation of the same on the line 3—3 of Fig. 2.

The casing 10 of the camera is provided with a bellows compartment 11 in which is secured the rear end of the bellows 12 adapted to be folded in the compartment 11. The bellows 12 is provided at its forward end with a carrier plate 13 supporting a suitable objective 14, and the said carrier plate 13 is adapted to be attached to side plates 16 and 17 hinged to the front of the casing 10 and adapted to fold one in front of the other, as hereinafter more fully explained.

The casing 10 is provided on opposite sides of the bellows compartment 11 with spool compartments 20 and 21 in which are mounted to turn the feed spool 22 and the winding up spool 23, of which the latter is provided with spaced turning means 24 extending to the top of the casing 10 for turning the winding-up spool to draw the film across the rear of the compartment 11 after an exposure is made. The compartments 11, 20 and 22 are adapted to be closed by a flexible back 30 made of reinforced leather or other suitable material and having one end reinforced by a metallic strip 31 fastened by screws 32 or other means to the front of the casing at the spool chamber 20. The free end of the back 30 is reinforced by a metallic strip 33 provided with a bar 34 and having a cut-out portion 35 for engagement with a stud 36 secured on the front of the casing at the compartment 21. By the arrangement described the flexible back 30 can be readily swung into an open position for gaining convenient access to the spools 22 and 23 to permit of placing a new film in position in the compartment 20 and then extending the film across the rear of the compartment 11 to engage the free end of the film with the spool 23 to permit of drawing the film across the field of the objective 14 at the rear of the compartment 11. After a new film has been placed in position the back 30 is swung into closed position and the bar 34 at the cut-out portion 35 is engaged with the stud 36 to securely hold the back 30 locked in closed position. The stud 36 is preferably provided with an undercut 37 forming a seat for the corresponding portion of the bar 34 to rest in to hold the back 30 locked against accidental opening. The stud 36 is beveled at its outer end in an inward direction to permit of drawing the back 30 tightly in position when closing the same. The free end of the back 30 is preferably provided with a handle 38 to permit of readily closing or opening the back 30. This handle 38 is preferably provided with eyes 39 pivoted on the bar 34 on opposite sides of the cut-out portion 35. The handle 38 is preferably curved and is adapted to be folded onto the outer face of the free end of the back 30 when not in use (see Fig. 2).

In order to render the construction of the casing 10 and its back 30 light-proof, the rear of the casing is provided at the top and bottom with ledges 40 covered with strips of velvet, felt or other similar material, and adapted to be engaged by the back 30 when closing the same to prevent light from passing to the film in the casing. The rear faces of the top, bottom and sides of the compartment 11 are provided with strips 41 of velvet, felt or other material, over which the film is drawn when winding up the winding-up spool 23.

It will be noticed that when the several parts are in a folded position the objective 14 is protected by the plate 17 and the latter is locked to the folded side plate 16 by the catch 56.

When it is desired to remove an exposed film and replace it by a new one then the camera can be readily opened by opening the flexible back 30, as previously explained.

The back 30 is provided with a colored pane 80 for viewing the identification character on the film when winding up the latter on the spool 23.

Having thus described my invention, I claim as new and desire to secure by Letters Patent:—

1. In a roll film camera, a casing having spool compartments at the sides, a one piece flexible back extending from one side of the casing to the other side thereof, said flexible back being permanently attached at one end to one side of the casing at the outer side of one of said spool compartments, and the opposite end of said flexible back adapted to close around the outside of the other of said spool compartments.

2. In a roll film camera, a casing having semi-circular ends, a one piece flexible back permanently attached at one end to and surrounding one semi-circular end and surrounding the opposite semi-circular end and detachably held thereon.

3. In a roll film camera, a casing provided with a one-piece flexible back permanently attached at one vertical end to the casing at one side thereof, and attaching means detachably connecting the other vertical end of the said back with the camera casing, the said attaching means having one member fixed on the casing and having another on the free end of the said one piece back held to the fixed member by the inherent flexibility of the back.

4. In a roll film camera, a casing provided with a flexible back permanently attached at one end to the casing, a stud fixed on the casing, and a loop pivoted on the free end of the said back and adapted to engage the said stud.

5. In a roll film camera, a casing provided with a flexible back permanently attached at one end to the casing, attaching means detachably connecting the other end of the said back with the camera casing, the said attaching means having a stud fixed on the casing and having a member on the free end of the said back and adapted to engage the said stud, and a handle on the free end of the said flexible back.

6. In a roll film camera, a casing having spool receiving compartments at the sides, a one piece flexible back extending from one side of the casing to the other side thereof, the said back being permanently attached at one end to one side of the casing at the outer side of one of the said spool compartments, and connecting means connecting the free other end of the said flexible back to the other end of the casing at the outer side of the other spool compartment.

7. In a roll film camera a casing provided with a flexible back permanently attached at one end to the casing, attaching means detachably connecting the other end of the said back with the camera casing said means consisting of a stud fixed on the casing adjacent the free end of the back, said free end having a notched edge and a pin bridging said notch and adapted to be engaged and held by said stud.

8. In a roll film camera a casing provided with a flexible back permanently attached at one end to the casing, attaching means for detachably connecting the free end of the said back with the camera casing, said means including an undercut stud fixed on the casing adjacent the free end of the back, said free end having a notched edge, a pin bridging said notch and a handle mounted to swing on said bridge pin, said pin adapted to be held by said stud and to be released therefrom by said handle.

HENRY W. HALES.